United States Patent [19]

Meng et al.

[11] Patent Number: 6,041,322
[45] Date of Patent: Mar. 21, 2000

[54] METHOD AND APPARATUS FOR PROCESSING DATA IN A NEURAL NETWORK

[75] Inventors: Wan-Yu Meng; Cheng-Kai Chang, both of Taipei; Hwai-Tsu Chang, Hsinchu; Fang-Ru Hsu, Hsinchu; Ming-Rong Lee, Hsinchu, all of Taiwan

[73] Assignee: Industrial Technology Research Institute, Taiwan

[21] Appl. No.: 08/839,818

[22] Filed: Apr. 18, 1997

[51] Int. Cl.[7] .................................. G06E 1/00; G06E 3/00
[52] U.S. Cl. .................................. 706/43; 706/25; 706/31; 706/38; 706/41
[58] Field of Search .................................. 706/15, 16, 25, 706/26, 31, 38, 41, 43

[56] References Cited

U.S. PATENT DOCUMENTS

| | | | |
|---|---|---|---|
| 3,950,733 | 4/1976 | Cooper et al. | 706/26 |
| 5,014,219 | 5/1991 | White | 706/25 |
| 5,165,009 | 11/1992 | Watanabe et al. | 706/41 |
| 5,204,938 | 4/1993 | Skapura et al. | 706/42 |
| 5,398,302 | 3/1995 | Thrift | 706/25 |
| 5,438,646 | 8/1995 | Davidian | 706/41 |
| 5,517,600 | 5/1996 | Shimokawa | 706/15 |
| 5,619,617 | 4/1997 | Furuta et al. | 706/25 |

OTHER PUBLICATIONS

Neural Networks and Fuzzy–Logic Control on Personal Computers and Workstations, by Granino A. Korn, pp. 106–107, Jan. 1995.

Hitachi, Others Ready Devices For Market: Neural Microchips Go Commercial Electronic Engineering Times, pp. 1, Jun. 22, 1992.

Lee, Bang et al., Paralleled Hardware Annealing For Optimal Solutions on Electronic Neural Networks, IEEE Transactions on Neural Networks, vol. 4, No. 4, pp. 588–599, Jan. 1993.

*Primary Examiner*—Tariq R. Hafiz
*Assistant Examiner*—Wilbert L. Starks, Jr.
*Attorney, Agent, or Firm*—Finnegan, Henderson, Farabow, Garrett & Dunner, L.L.P.

[57] ABSTRACT

A digital artificial neural network (ANN) reduces memory requirements by storing sample transfer function representing output values for multiple nodes. Each nodes receives an input value representing the information to be processed by the network. Additionally, the node determines threshold values indicative of boundaries for application of the sample transfer function for the node. From the input value received, the node generates an intermediate value. Based on the threshold values and the intermediate value, the node determines an output value in accordance with the sample transfer function.

7 Claims, 20 Drawing Sheets

TABLE 104

| k | k-4 | $2^{k-1}$ | $-2^{k-1}$ | SHIFT AMOUNT OF BARREL SHIFT |
|---|---|---|---|---|
| 4 | 0 | 00000000000000001111 | 11111111111111110001 | 00001000000000000000 |
| 5 | 1 | 00000000000000011111 | 11111111111111100001 | 00000100000000000000 |
| 6 | 2 | 00000000000000111111 | 11111111111111000001 | 00000010000000000000 |
| 7 | 3 | 00000000000001111111 | 11111111111110000001 | 00000001000000000000 |
| 8 | 4 | 00000000000011111111 | 11111111111100000001 | 00000000100000000000 |
| 9 | 5 | 00000000000111111111 | 11111111111000000001 | 00000000010000000000 |
| 10 | 6 | 00000000001111111111 | 11111111110000000001 | 00000000001000000000 |
| 11 | 7 | 00000000011111111111 | 11111111100000000001 | 00000000000100000000 |
| 12 | 8 | 00000000111111111111 | 11111111000000000001 | 00000000000010000000 |
| 13 | 9 | 00000001111111111111 | 11111110000000000001 | 00000000000001000000 |
| 14 | 10 | 00000011111111111111 | 11111100000000000001 | 00000000000000100000 |
| 15 | 11 | 00000111111111111111 | 11111000000000000001 | 00000000000000010000 |
| 16 | 12 | 00001111111111111111 | 11110000000000000001 | 00000000000000001000 |
| 17 | 13 | 00011111111111111111 | 11100000000000000001 | 00000000000000000100 |
| 18 | 14 | 00111111111111111111 | 11000000000000000001 | 00000000000000000010 |
| 19 | 15 | 01111111111111111111 | 10000000000000000001 | 00000000000000000001 |

METHOD AND APPARATUS FOR PROCESSING DATA IN A NEURAL NETWORK

BACKGROUND OF THE INVENTION

1. Field of the Invention

This invention relates generally to artificial neural networks, and, more particularly to a digital artificial neural network that uses less memory. The memory reduction is achieved by storing a sample transfer function in a memory and mapping the sample transfer function to a network node to achieve an output value ior the node.

2. Description of the Related Art

Artificial Neural Networks ("ANN") process information in a manner similar to the human brain. An ANN typically consists of input nodes, output nodes, and, in most cases, hidden nodes. A node is simply a data processing device capable of receiving multiple inputs and generating a single output based on those inputs. In a typical ANN this means the input nodes receive one input, hidden nodes receive several inputs, and output nodes receeive several inputs. The hidden nodes derive their name because they do not receive any input signals from sources outside the ANN, nor do they output signals to any devices outside the ANN and, thus, they are hidden from the universe existing outside the ANN.

FIG. 1 shows a basic ANN 100 consisting of input nodes 2, hidden nodes 4, and output nodes 6. Arrows 8 connecting the different nodes represent the direction of information flow through ANN 100. FIG. 1 shows information flowing from input nodes 2 to hidden nodes 4 and from hidden nodes 4 to output nodes 6. As can be seen, all the information in ANN 100 flows from input nodes 2 to output nodes 6 and no information flowvs in the opposite direction. This is generally known as a feedforward network. As represented by the dashed arrow 10, some feedforward networks exist where input node 2 may be connected directly to output node 6. Other types of ANNs include feedback loops. For example, ANN 200 shown in FIG. 2 contains multiple layers of hidden nodes 4. As showvn by arrow 12, hidden node 24, in the second hidden layer, feeds information back to the input of hidden node 22, in the first hidden layer, forming a feedback loop in the network.

FIG. 3A shows an individual node 32 of an ANN. Node 32 receives a plurality of inputs $34_1$ to $34_n$ and generates a single output 36. The process for generating an output signal from node 32 uses a transfer function. Equation (1) represents a typical transfer function:

$$F_{output} = f(34_1, 34_2, 34_3, \ldots 34_n) \quad (1)$$

In other words, output 36 is a function of all inputs $34_1$ to $34_n$. Nodes in lower levels provide inputs to nodes in higher levels. Each node in a higher level, however, does not necessarily receive an input from all the nodes in lower levels. For example, node 32 may only receive an input from every even node of the preceding level. Such, a node may be represented by the following equation:

$$F_{output} = f(34_2, 34_4, 34_6, \ldots 34_n) \quad (1a)$$

While several different variations on transfer functions are possible, a common transfer function is known as a sigmoid function. FIG. 4 is a graphical representation of a sigmoid function 42 defined by equation (2).

$$F_{output} = 1/(1+e^y) \text{ where } y=\Sigma(W_i X_i) \text{ or } y=\Sigma(W_i-X_i)^2 \quad (2)$$

As can be seen from FIG. 4, sigmoid function 42 is a nonlinear function where $F_{output}$ approaches a constant value, ±saturation, as the sum of the inputs y approach ±∞. $F_{output}$ never actually reaches either ±saturation; however, at the corresponding ±threshold value the difference between the $F_{output}$ and ±saturation is below an acceptable tolerance such that it is beneficial to define $F_{output}$ as equal to ±saturation.

FIG. 3B represents how node 32 divides equation (2) into two parts. Subnode 32a performs the first part and subnode 32b performs the second part. Subnode 32a receives inputs $34_1$ to $34_n$ from the previous layer's nodes (not shown). A summer in subnode 32a then multiplies each input $34_i$ by its associated weight factor $W_i$ and adds the weighted inputs $34_i$ together to generate an intermediate value y or weighted input y. Intermediate value y is then transferred to a processor in subnode 32b. Subnode 32b processes the intermediate value y according to equation (2) and generates output signal 36. Every node 32 in an ANN has its own transfer function; however, the individual transfer functions are commonly designed to be of the same general category.

Weight factor $W_i$ corresponds to the importance of a particular input $34_i$ (for i=1 to n) in determining output 36 of node 32. ANN 100 learns by changing weight factor $W_i$ of inputs $34_i$. One method of changing weight factor $W_i$ is through a supervised learning alogrithm. A supervised learning algorithm learns by supplying external test signals to ANN 100. These external test signals have known outputs. If the outputs are not achieved, ANN 100 corrects the weight factors $W_i$ until the known output is achieved within a certain error or tolerance.

Several methods of adjusting weight factors $W_i$ exist. One such method is generally known as gradient-descent or backpropagation. Backpropagation works by inputting known quantities into ANN 100 to achieve output 36. As illustrated in FIG. 5, output 36 is inputted into a comparator 52. Comparator 52 also receives a desired output 54. Desired output 54 is the value output 36 should have based upon known input quantities. Comparator 52 compares outputs 36 and 54 and generates a weight factor adjust signal 56 that is used by the summer in subnode 32a in an iterated process to adjust weight factors $W_i$ until the error between output 36 and desired output 54 is minimized. For a thorough discussion of Artificial Neural Networks see Simon Haykin, *Neural Networks: A Comprehensive Foundation*, Macmillan College Publishing Co., 1994.

The above described ANN 100 can be implemented using either analog or digital techniques. A exemplary digital ANN 102 is illustrated in FIG. 6A. As shown, information processors 62a–c, 64a–c, and 66a–c represent various nodes of digital ANN 102. Processors 62a, 62b, and 62c represent input nodes. Processors 64a, 64b, and 64c represent hidden nodes. Processors 66a, 66b, and 66c represent output nodes. In this example, the transfer function, i.e., equation (1), is stored in a central transfer function memory 68 accessible by each of the processors. Alternatively, the transfer function may be resident in a memory (not shown) of each processor. FIG. 7 illustrates a graphical representation of a digital transfer function 70. Digital transfer function 70 consists of a series of sample points X of analog transfer function 42 stored in memory 68. One digital transfer function 70 is stored in memory 68 for each information processor 62a–c, 64a–c, and 66a–c of digital ANN 102.

FIG. 6B is a block diagram of a typical processor 82 for digital ANN 102, such as would be provided for any of processors 62a–c, 64a–c, and 66a–c. Processor 82 receives inputs $84_1$ to $84_n$, accesses transfer function memory 68, and determines output 86. For a complete description of Digital ANNs see U.S. Pat. No. 5,204,938, issued to David M.

Skapura and Gary J. McIntire, "Method of Implementing a Neural Network on a Digital Computer." In current digital implementations, however, a digital transfer function is stored for each processor. The capacity of transfer function memory 68, therefore, must be large enough to store one transfer function for each processor of digital ANN 102. Alternatively each processor must store a particular transfer function in a resident memory. This requires significant memory resources for large scale digital ANNs, that in turn increases the cost of implementing large scale digital ANNs. Thus, it would be beneficial to provide a method that reduces the storage capacity required by digital ANNs and still allow effective and efficient implementation of the digital ANN.

SUMMARY OF THE INVENTION

The advantages and purpose of this invention will be set forth in part from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, systems consistent with the present invention reduce the memory requirements for a digital ANN by storing a sample transfer function representing output values for multiple nodes of a neural network. Each node receives at least one input value representing the information to be processed by the network. Additionally, the node determines threshold values indicative of boundaries for application of the sample transfer function for the node. From the input value received, the node generates an intermediate value. Based on the threshold values and the intermediate value, the node determines an output value in accordance with the sample transfer function.

BRIEF DESCRIPTION OF THE DRAWINGS

The accompanying drawings, which are incorporated in and constitute a part of this specification, illustrate preferred embodiments of the invention and, together with the description, explain the goals, advantages and principles of the invention. In the drawings.

FIG. 11 is an example of a table including threshold values and shift values;

DESCRIPTION OF THE PREFERRED EMBODIMENT

Reference will now be made in detail to the present preferred embodiments of the invention, examples of which are illustrated in the accompanying drawings. It is intended that all matter contained in the description below or shown in the accompanying drawings shall be interpreted as illustrative and not in a limiting sense.

Figure 1:
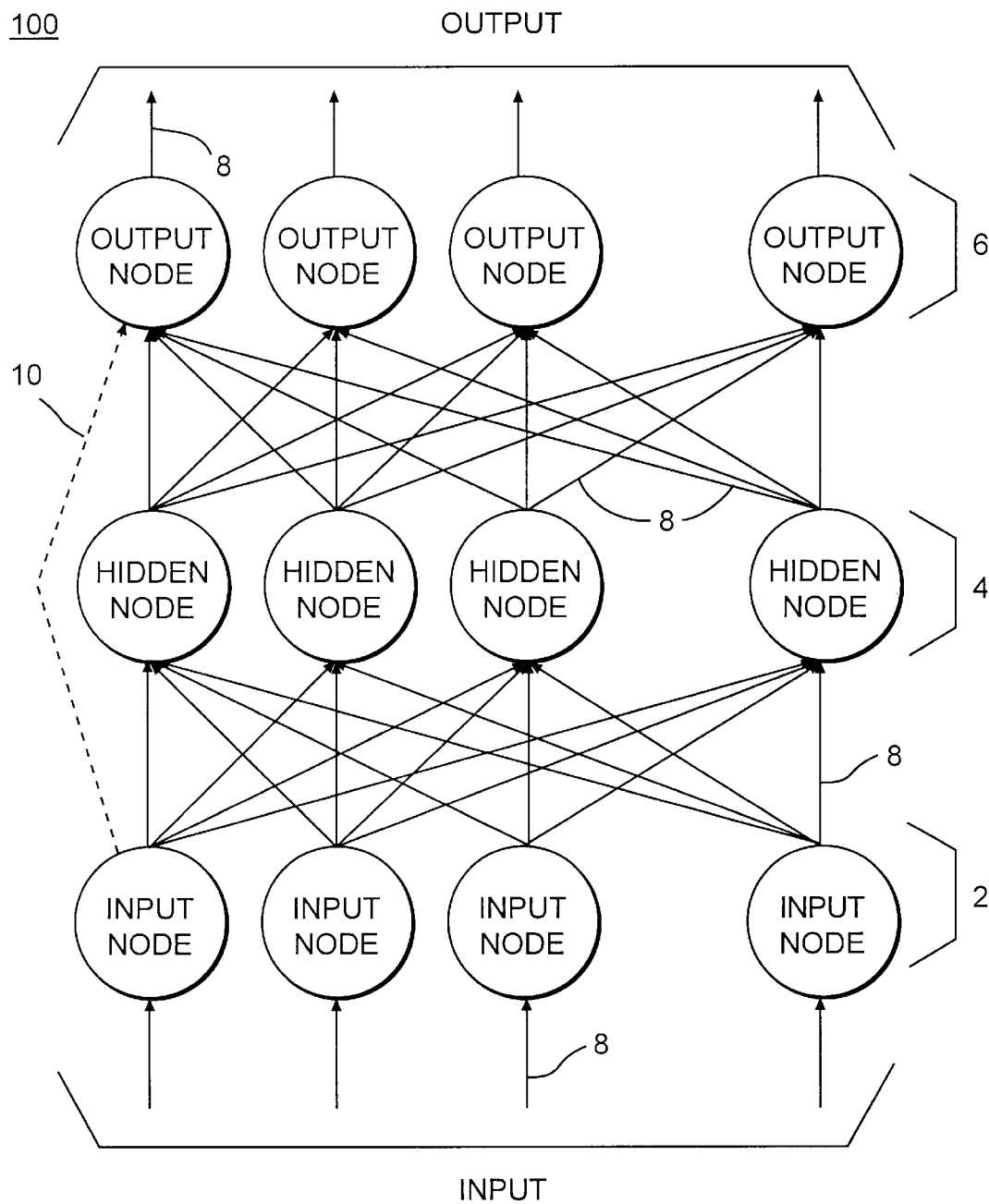
FIG. 1 is a block diagram of a basic feedforward neural network.
Figure 2:
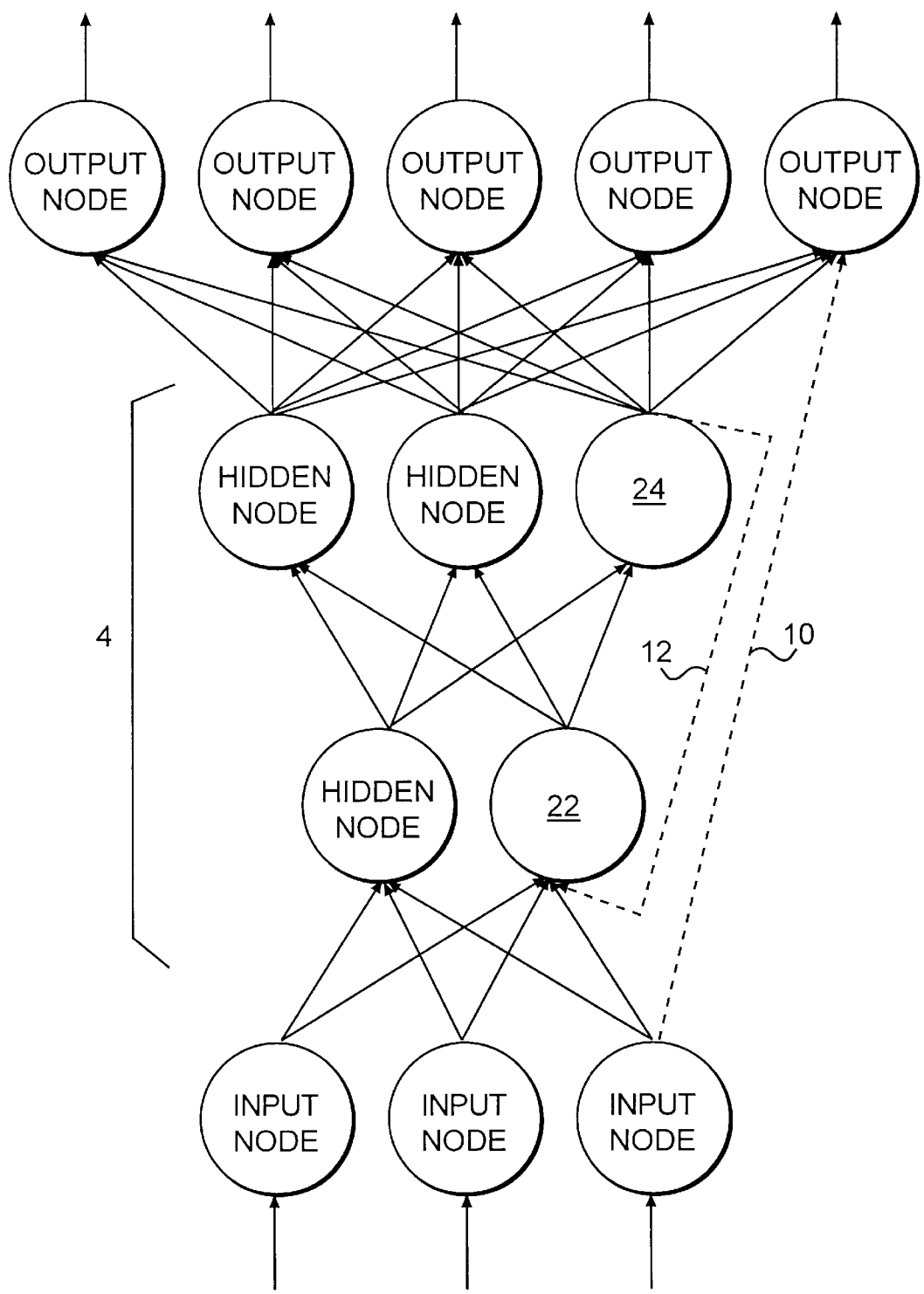
FIG. 2 is a block diagram of a neural network with a feedback loop.
Figure 3A:
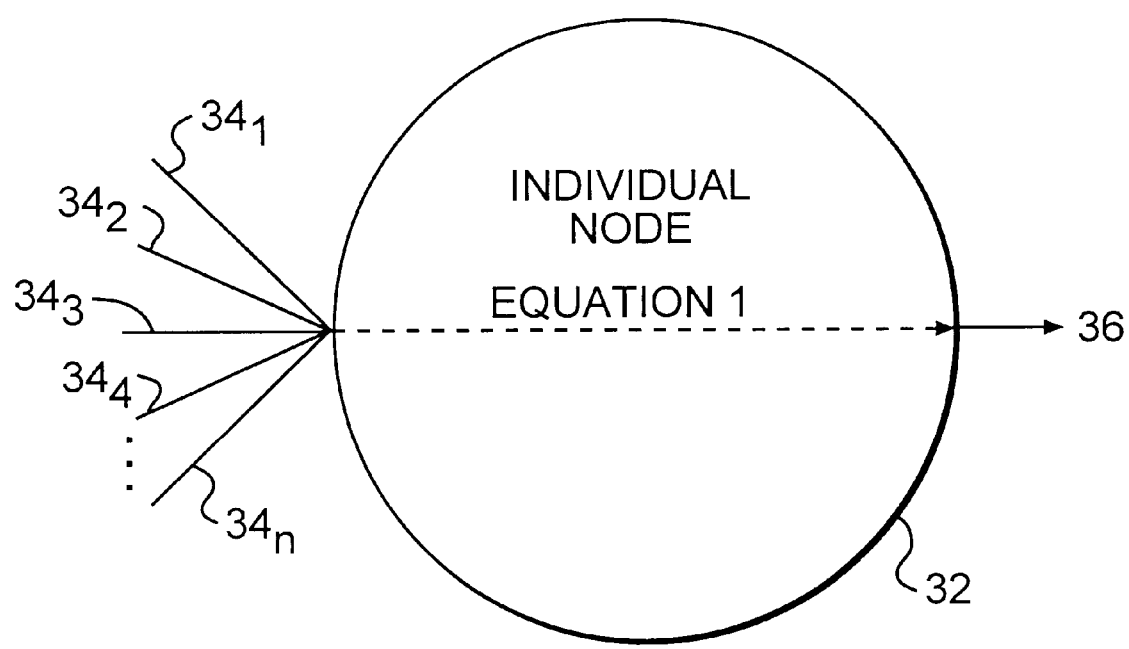
FIG. 3A is a block diagram of a network node.
Figure 3B:
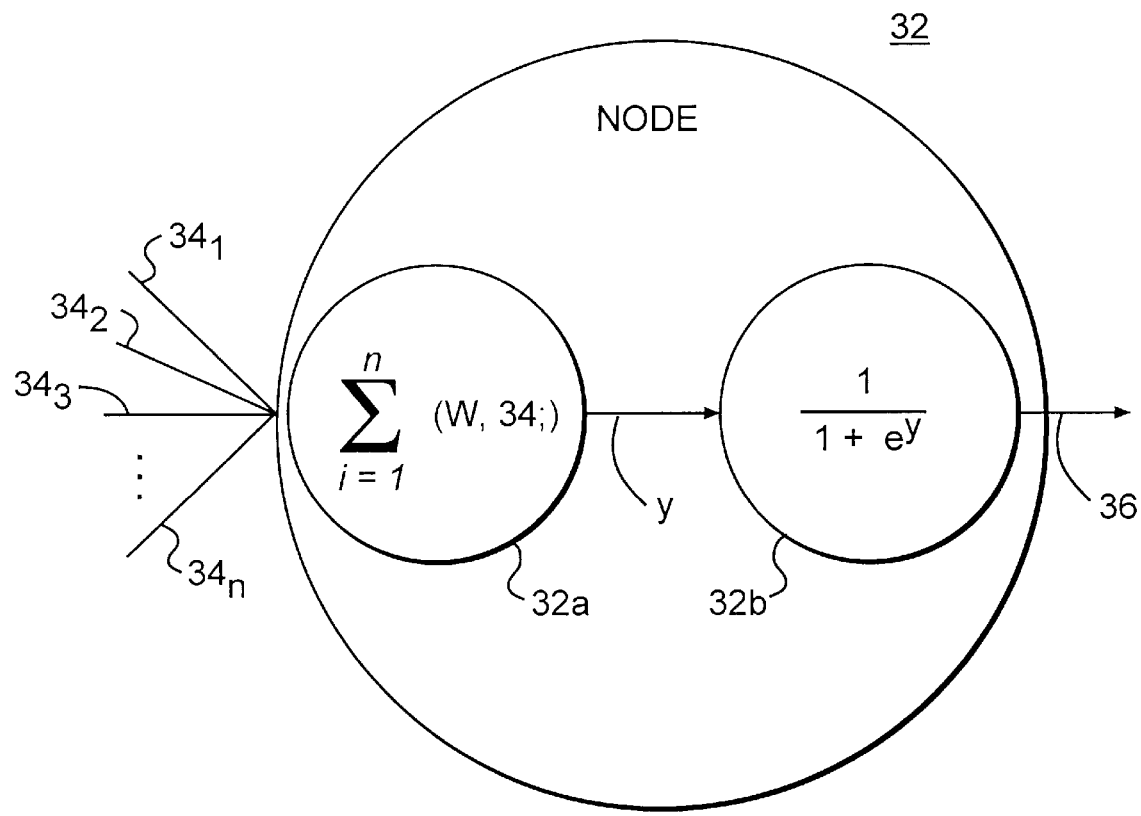
FIG. 3B is a functional representation of a network node implementing a sigmoid transfer function.
Figure 4:
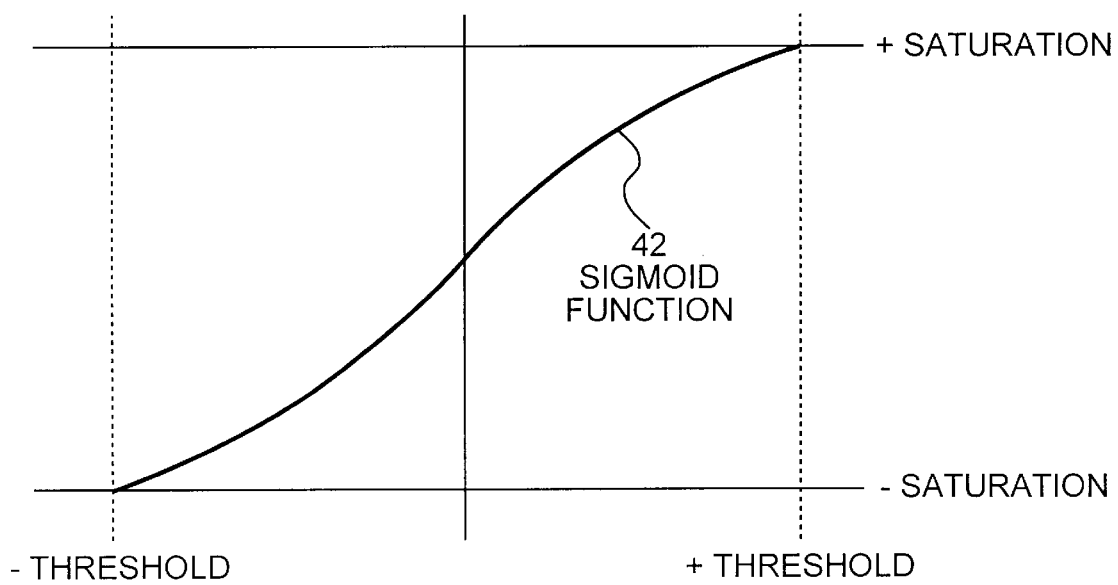
FIG. 4 is a graph of a sigmoid transfer function.
Figure 5:
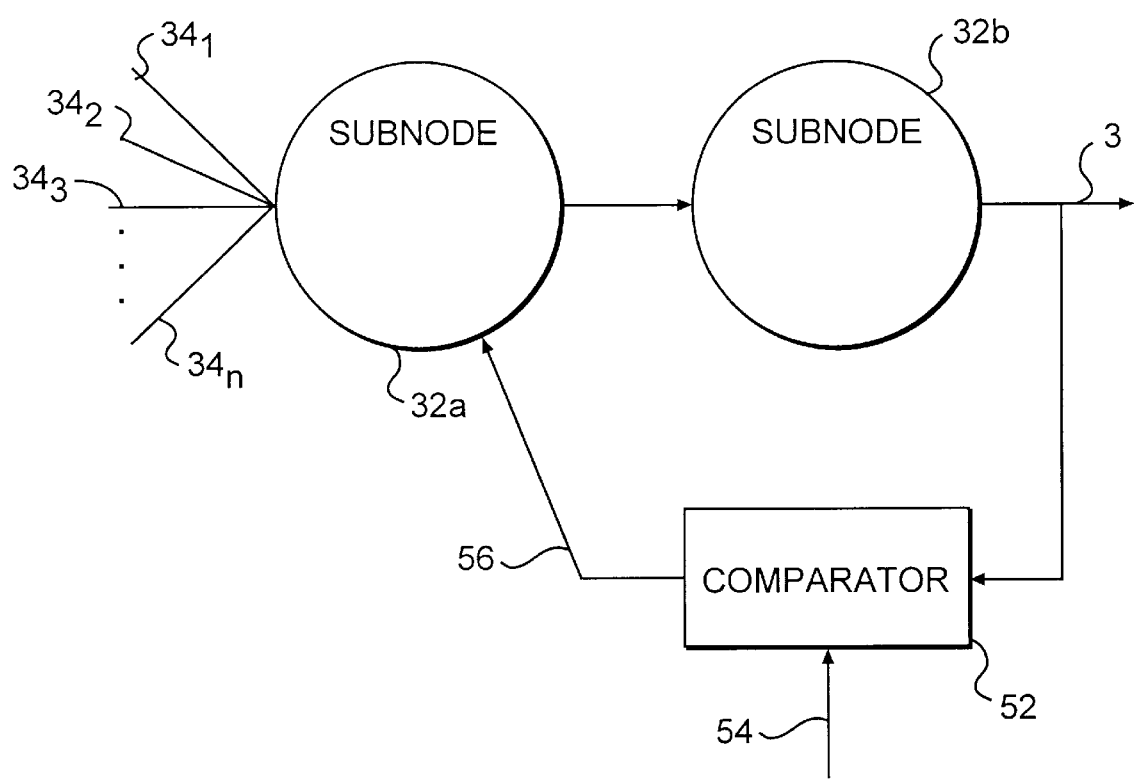
FIG. 5 is a block diagram of a node with supervised learning.
Figure 6A:
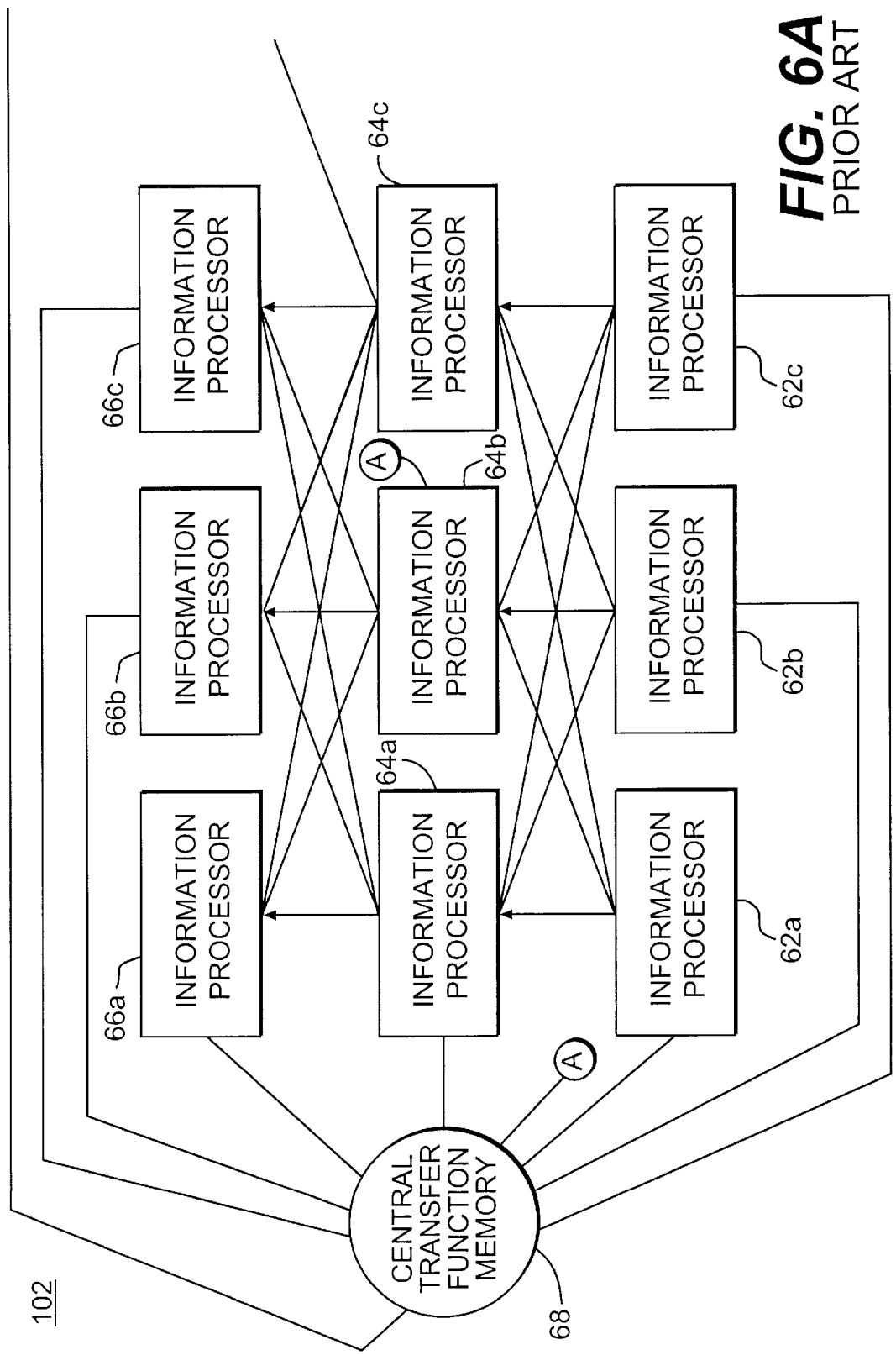
FIG. 6A is a functional block diagram of a digital implementation of a feedforward network.
Figure 6B:
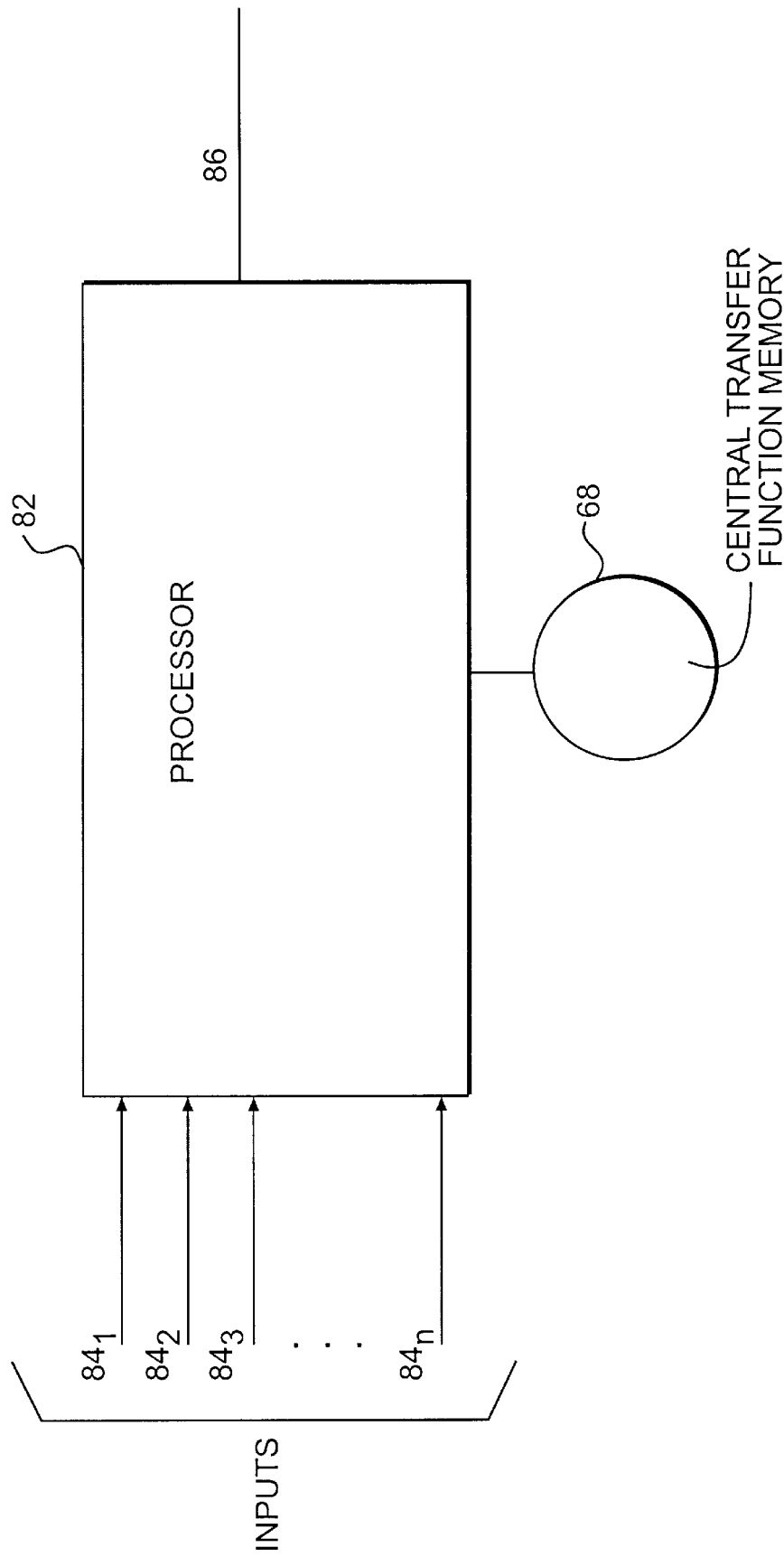
FIG. 6B is a functional block diagram of a digital processor representing a neural node in a digitally implemented ANN.
Figure 7:
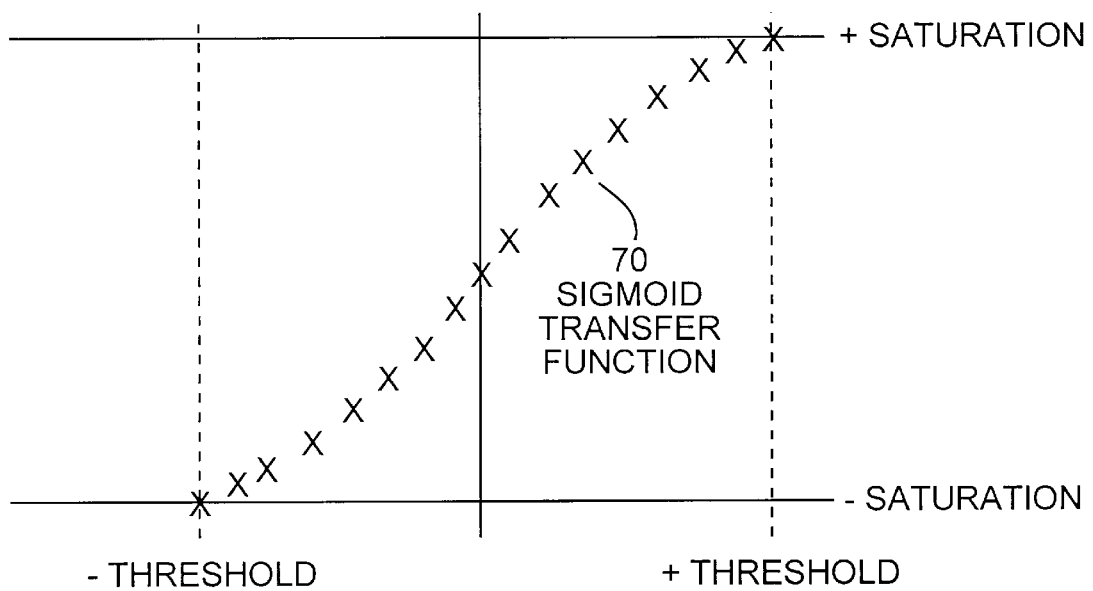
FIG. 7 is a graph representing the digital samples of a sigmoid transfer function.
Figure 8A:
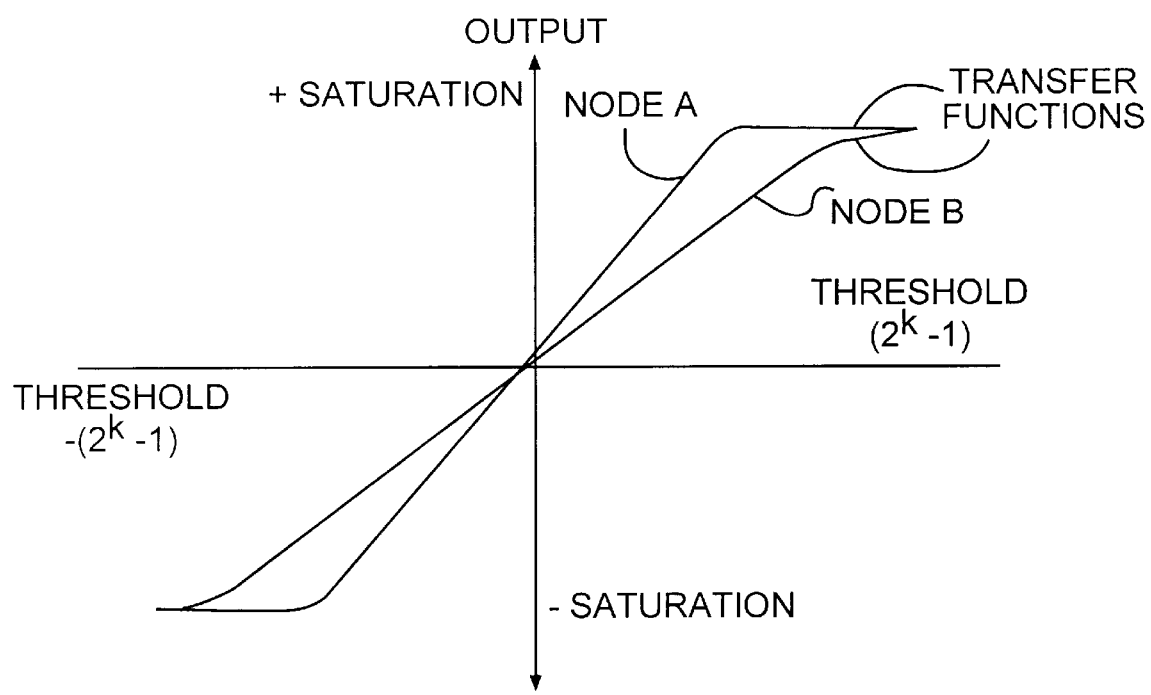
FIG. 8A is a graph of transfer functions for nodes A and B.
Figure 8B:
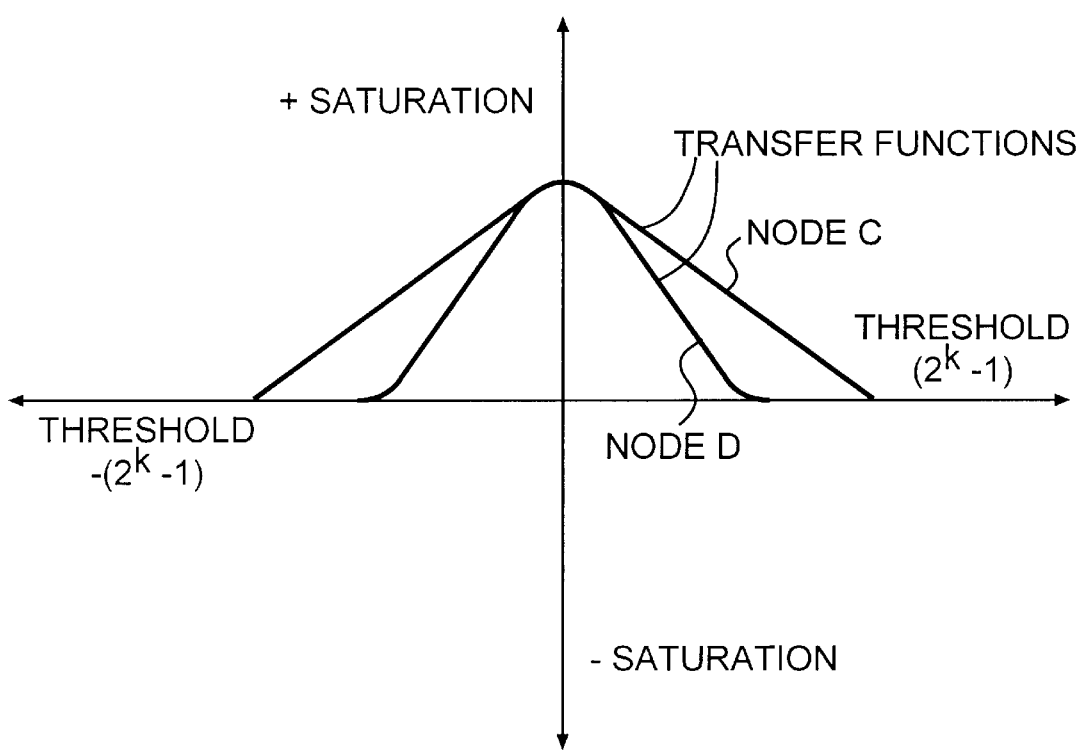
FIG. 8B is a graph of transfer functions for nodes C and D.

Digital ANNs store transfer functions for each processor in the ANN transfer function memory. Many of the processor nodes have the same or similar transfer functions with different parameters. For instance, FIG. 8A shows a sigmoid transfer function for a processor Node A and a processor Node B having a similar sigmoid transfer function with different parameters. The transfer function for processor Node A has a steeper gradient than that of processor Node B; otherwise, the shape of both functions is identical. FIG. 8B shows another type of transfer function for processor Nodes C and D. As FIGS. 8A and 8B illustrate various transfer functions may be used while implementing the concepts of the present invention. Although the description that follows is limited to the sigmoid transfer function represented in FIG. 8A, other types of transfer functions that can be implemented include all one-to-one functions (only one output value for any given input value), whether smooth or non-smooth, monotonic or non-monotonic, symmetric or non-symmetric, etc. Transfer functions that approach saturation values as the inputs approach $\pm\infty$ are preferred. The description that follows, however, is limited to the sigmoid transfer function represented in FIG. 8A.

Systems consistent with the present invention take advantage of the similarity in shape of the transfer function of different processor nodes to reduce the amount of data stored in the memory of the digital ANN. This is done by using the memory of the digital ANN to store a sample transfer function representative of the shape of the transfer function associated with each processor node using the same type of transfer function. Each processor node processes inputs to obtain an intermediate value, including, for example, a weighted sum of the inputs. Additionally, the digital ANN determines a value representing a specific transfer function through a learning process. The digital ANN uses this value to define a correlation between the sample transfer function stored in memory and the specific transfer function of the processor node. Based on the intermediate value and the determined correlation, each processor node determines an output value from the sample transfer function stored in memory.

Figure 9:
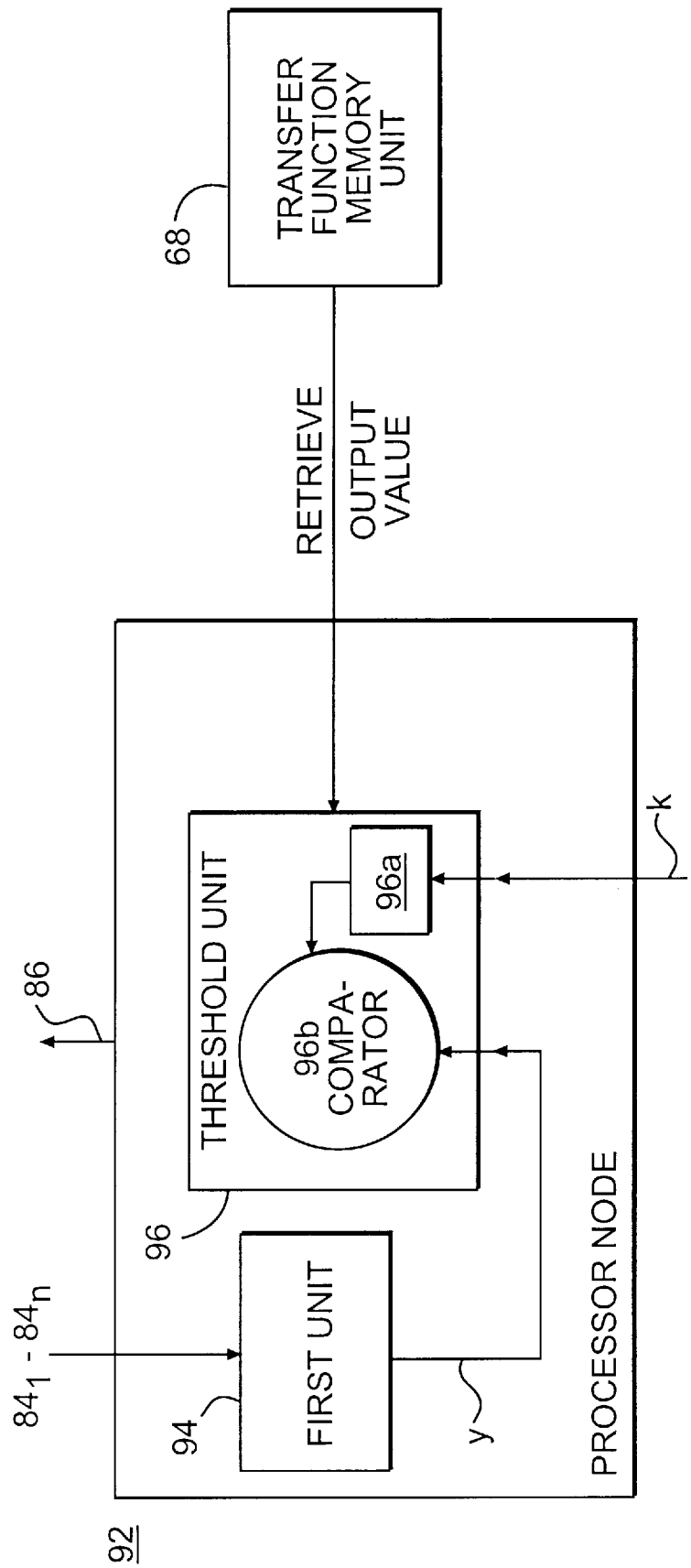
FIG. 9 is a block diagram of a processor node.

Digital ANN 102 includes multiple processor nodes of the type illustrated in FIG. 9. A processor node 92 includes a first unit 94 and a threshold unit 96. First unit 94 receives inputs $84_1$ to $84_n$ and generates an intermediate value y. Threshold unit 96 receives intermediate value y and a value k determined during a learning process for ANN 102. The value k is a factor that determines the correspondence between a sample transfer function stored in a sample transfer function memory unit 68 and the specific transfer function of the processor node. Threshold unit 96 includes a mapper 96a for decoding the value k and a comparator 96b. Threshold unit 96 generates a memory address signal to retrieve an output value stored in sample transfer function memory unit 68.

Figure 10:
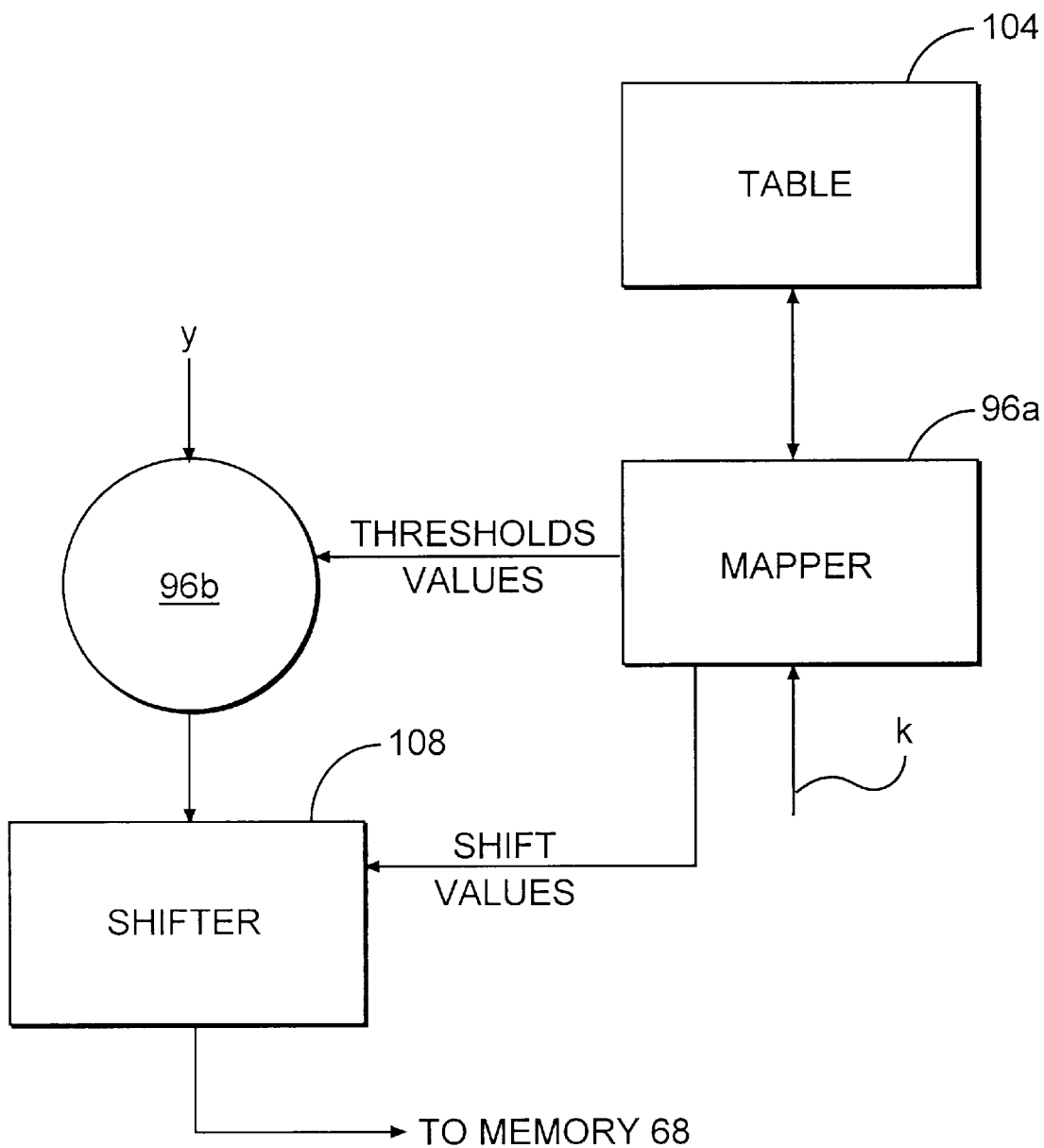
FIG. 10 is a block diagram of a threshold unit.

FIG. 10 is a block diagram of threshold unit 96. Threshold unit 96 includes decoder 96a, comparator 96b, a table 104, and a shifter 108. Threshold unit 96 uses the mapper value k provided by decoder 96a to access table 104, an example of which is shown in FIG. 11, and retrieve threshold values and a shift value. Mapper 96a, for example, converts the value k into a decoded value k, which may be a binary number between 0–15.

For example, digital ANN 102 learns a value k that is between 4 and 19. Mapper 96a processes this value by subtracting 4 to obtain a value k between 0 and 15. Processing the value k in this manner permits digital ANN 102 to constrain the resulting value k to a 4-bit value, whereas the value k is typically not a 4-bit value. By limiting the bit size of the processed value k, the size of table 104 is controlled. Although this configuration reduces implementation costs, other configurations that implement other types of processing functions, or implementation that do not require the function of mapper 96a, are consistent with the principles of the present invention. For example, the processed value k can be constrained to a 3-bit value or a 6-bit value, etc. From the processed value k, for example, k equal to 14, threshold unit 96 identifies the following from table 104:

1. a lower threshold value $-(2^k-1)$;
2. an upper threshold value $(2^k-1)$; and
3. a shift value.

Figure 12:
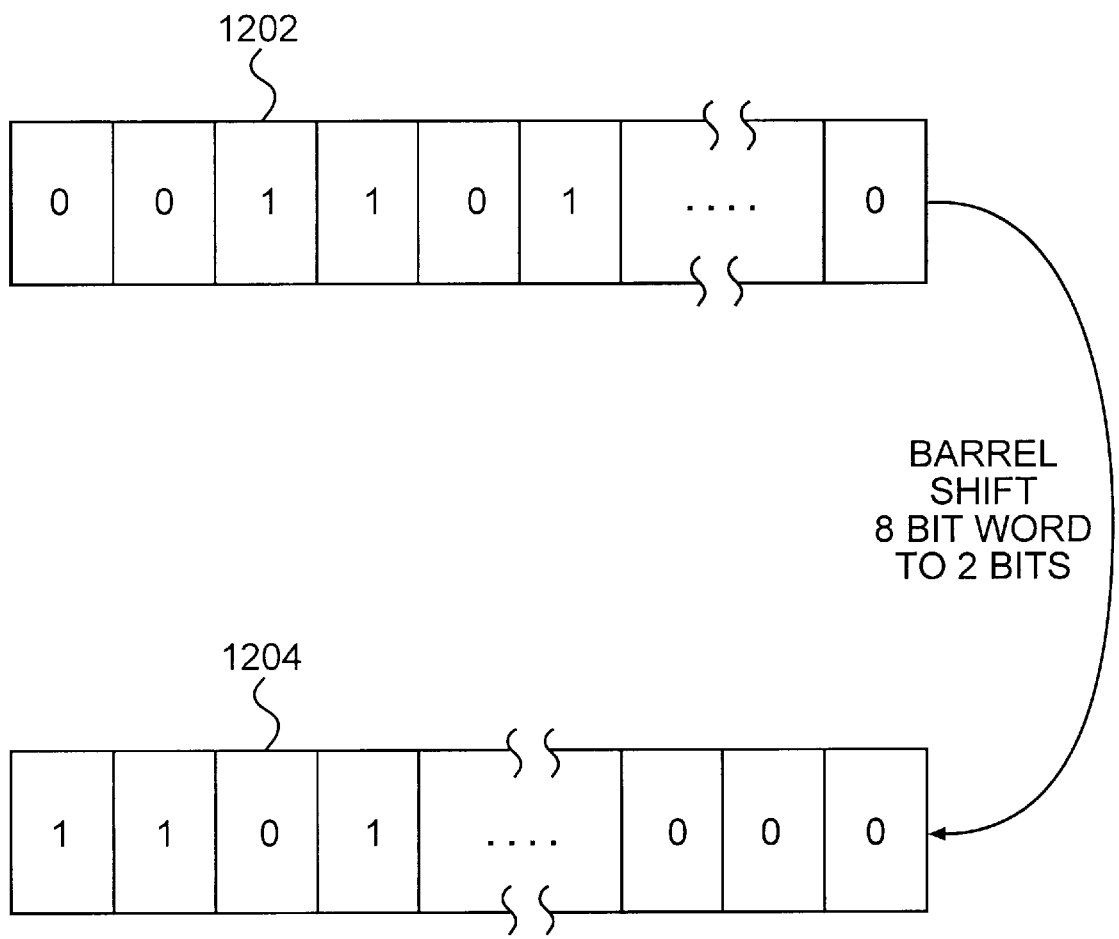
FIG. 12 is an example of an 8 bit word being shifted 3 bits.

For the value k equal to 18, the decoded value k equals 14, the threshold values $(2^k-1)$ and $-(2^k-1)$ are equal to binary numbers 1142 and 1144, respectively, and the shift value is equal to the binary number 1146. Mapper 96a provides the threshold values to comparator 96b, which uses the threshold values to evaluate the intermediate value y. Mapper 96a provides the shift value to shifter 108, which shifts the intermediate value y. If intermediate value y is not between threshold values 1142 and 1144, then comparator 96b determines output value 86 equals a preset saturation value. Otherwise comparator 96b provides intermediate value y to shifter 108. Shifter 108 shifts intermediate value y as shown in FIG. 12. Shifter 108 truncates the shifted intermediate value y to obtain an identifier. Using the identifier, threshold unit 96 retrieves output 86 identified by the shifted intermediate value y from the sample transfer function memory unit 68.

Threshold unit 96 uses table 104 (FIG. 10), which can be stored in a central memory accessible by each processor node or resident in each processor, to identify the threshold values and the shift value from the value k. For example, digital ANN 102 determines the value k from the learning process. The value k is processed into an identifier for table 104. Threshold unit 96 uses the identifier to access table 104 and retrieve the upper threshold value $(2^k-1)$, the lower threshold value $-(2^k-1)$, and the shift value. For example, when k equals 11 and the processed value k, which corresponds to the identifier, equals 7. The upper threshold value equals 00000000011111111111 (in the base 10 system the upper threshold value equals 2047), the lower threshold value equals 11111111100000000001 (in the base 10 system the lower threshold value equal –2047), and the shift value equals 00000000000100000000. The shift in this example is 9 places. If, for example, k equals 12 and the processed k equaled 8, then the shift value from table 104 would equal 00000000000010000000, which corresponds to an 8 place shift.

Threshold unit 96 performs several comparisons on intermediate value y to determine the output value. As FIG. 8A shows, the transfer function output for Nodes A and B, as well as any other node sharing the same sample transfer function, is bounded by threshold values. The threshold values are the points at which the output value obtained for the transfer function is within a predefined tolerance of a preset saturation value. When the intermediate value y is outside the range of values bounded by the threshold values the output value is set to equal a saturation value instead of processing the intermediate value using the transfer function. In this example, the threshold values are set to equal $\pm(2^k-1)$. Between the threshold values, however, the output value of the processor node is based on the transfer function which slopes between ±saturation values as in equation (2). Thus, output 86 of processor node 92 equals:

$$\text{Output } 86 = \begin{cases} -\text{saturation value} & \text{if } y \le -(2^k - 1) \\ \text{equation (2)} & \text{if } -(2^k - 1) \le y \le (2^k - 1) \\ +\text{saturation value} & \text{if } y \ge (2^k - 1) \end{cases} \quad (3)$$

As the threshold values vary, equation 3 varies in a defined manner, which is identified by the value k.

Figure 13:
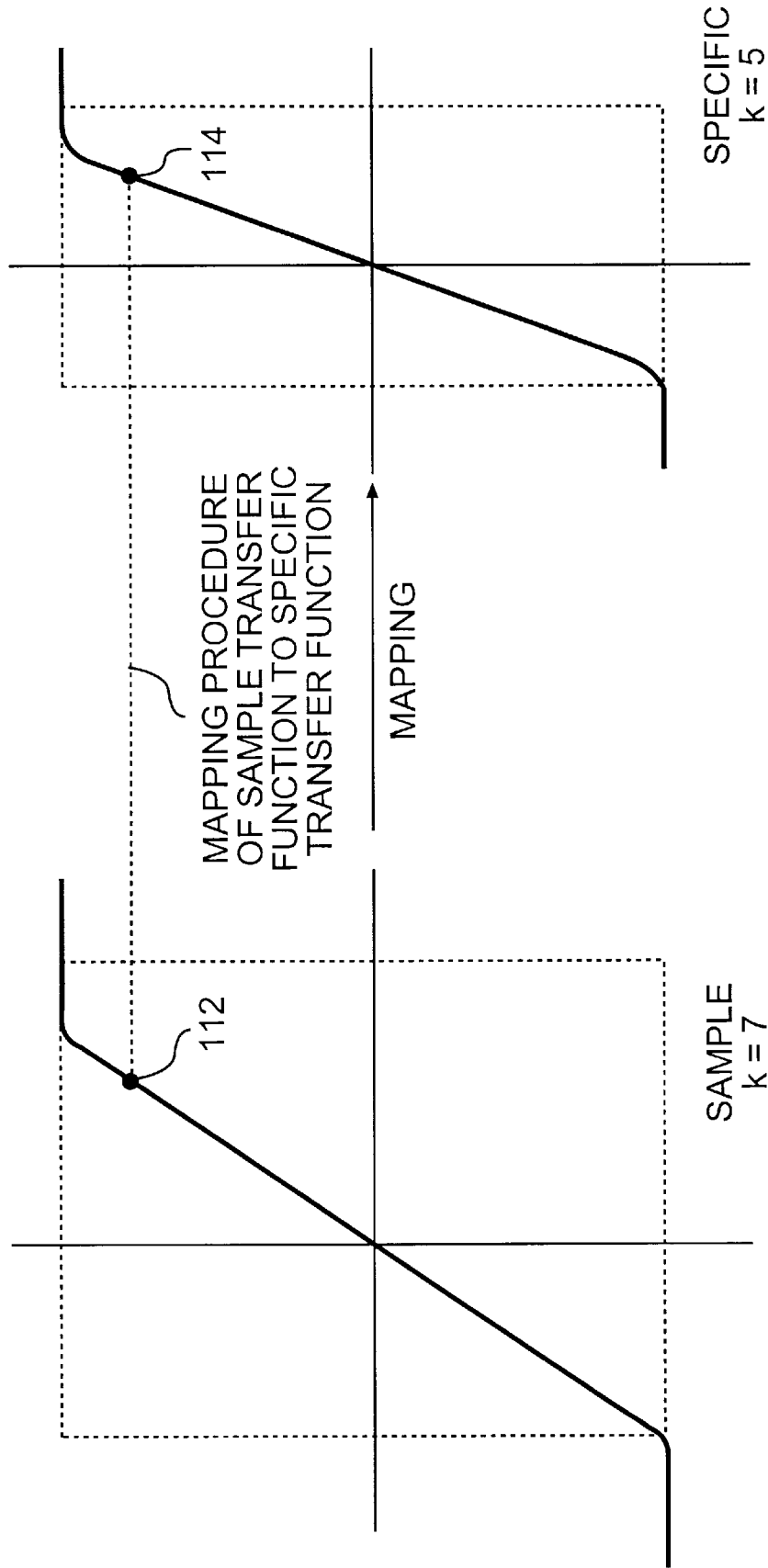
FIG. 13 is a graphical representation of the process of mapping a point from a sample transfer function to a point on a specific transfer function.

FIG. 13 illustrates the correlation between a sample transfer function and a processor node's specific transfer function. Specifically, FIG. 13 includes a graph representing a sample transfer function, which in this example is set to correspond with a value k equal to 7, a graph representing a specific transfer function for a node, which in this example is set to correspond to a value k equal to 5, and a mapping procedure used to map the output from the sample transfer function to the output value of the specific transfer function of the processor node. For example, it is assumed the sample transfer function corresponds to a decoded value k equal to 7 and processor node 92 has a specific transfer function of decoded value k equal to 5. To achieve output 86, the present invention maps point 112, which corresponds to the output value of the sample transfer function, to point 114, which corresponds to the output value from the specific transfer function of the processor node. Thus, the system processes the intermediate value y and applies the correlation identified by the value k to derive from the sample transfer function stored in memory 68 the output value for processor node 92.

Figure 14:
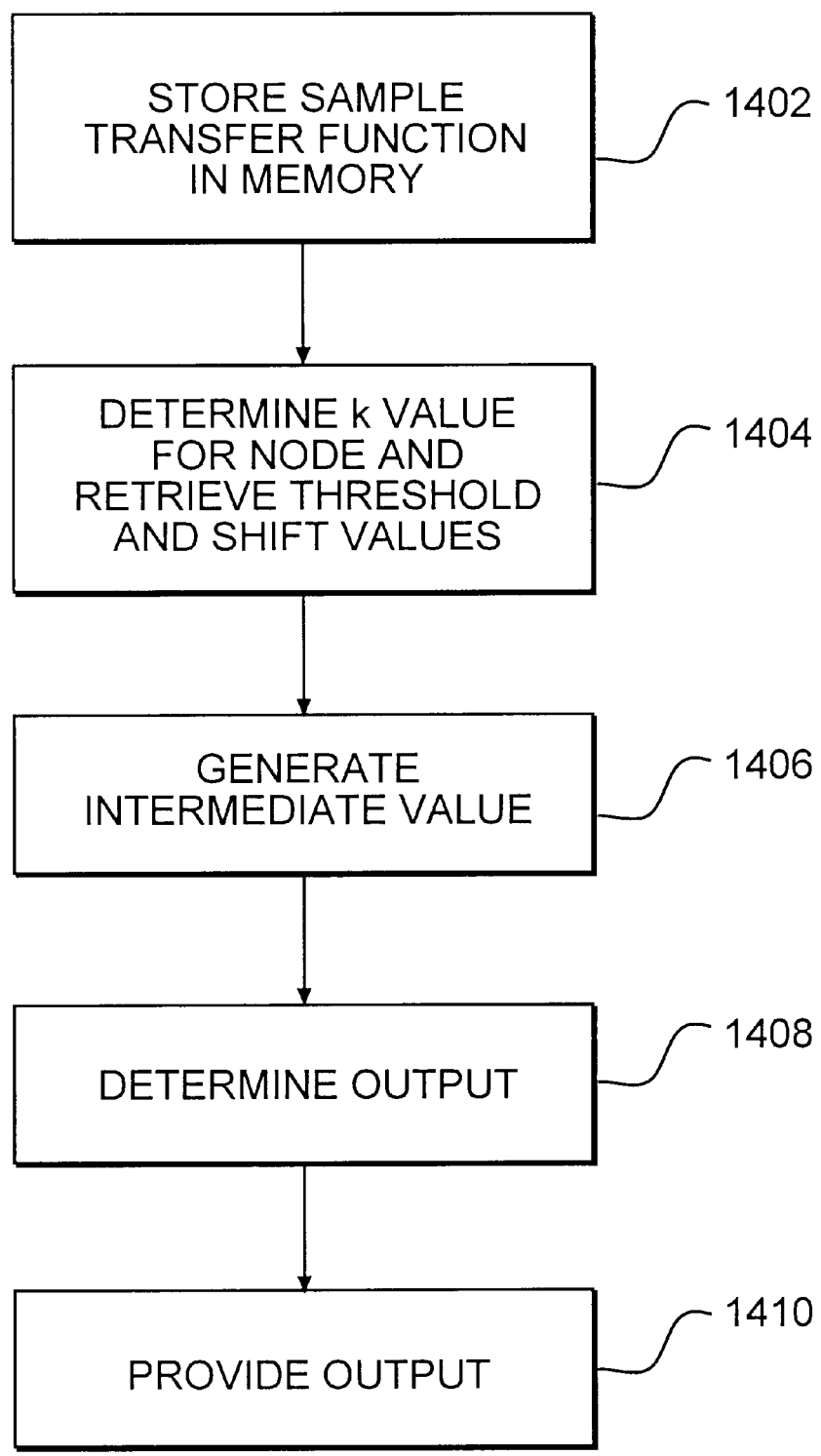
FIG. 14 is a flow chart of the steps performed by an ANN in accordance with the principles of the present invention.

FIG. 14 is a flow chart of the steps performed in mapping output 86 for the specific transfer function of processor node 92. First, the sample transfer function is designed to correspond to a decoded value k and stored in sample tansfer function memory unit 68 (step 1402). Digital ANN 102 calculates the k value for processor node 92, and retrieves the threshold value and shift value from table 104 (step 1404). At step 1106, processor node 92 receives the inputs and generates intermediate value y. Based on intermediate value y (step 1406), and the threshold values and shift value from table 104 (step 1404), processor node 92 determines the output value from sample transfer function memory unit 68 (step 1408). The output value corresponds to the output value from the specific transfer function used by processor node 92. The output value can then be provided as the output for processor node 92 (step 1410).

Figure 15:
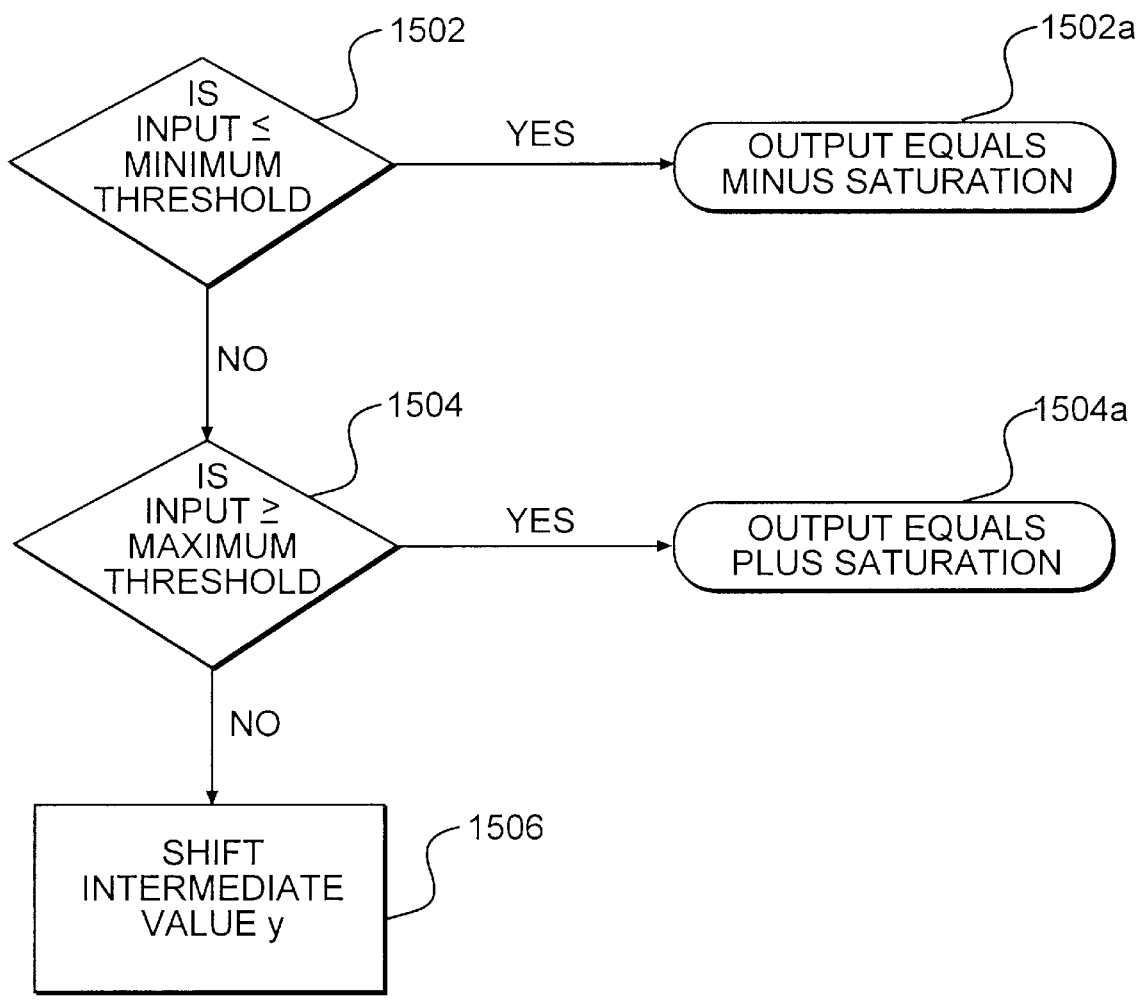
FIG. 15 is a flow chart of the steps of the mapping procedure in accordance with the principles of the present invention.

FIG. 15 is a flow chart of the steps for determining the output value for processor node 92 in more detail. First, threshold unit 96 determines whether the generated intermediate value y is less than or equal to a threshold value $-(2^k-1)$ (step 1502). If intermediate value y is less than or equal to a lower threshold value, then the output value of processor node 92 is a preset −saturation value (step 1502a). Second, threshold unit 96 determines whether the generated intermediate value y is greater than or equal to a threshold value $(2^k-1)$ (step 1504). If intermediate value y is greater than or equal to a threshold value, then the output value of processor node 92 is a preset +saturation value (step 1504a). Third, if neither of the above two conditions are satisfied, i.e., $-(2^k-1) \leq$ intermediate value $y \leq (2^k-1)$, then threshold unit 96 shifts intermediate value y by the shift value identified by table 104 (step 1506). FIG. 12 illustrates an example of shifting a 16-bit intermediate value y two bits. In particular a 16-bit number 1202 is shifted by 2 bits to provide a 16-bit number 1204. It is noted that FIG. 12 illustrates a 16-bit binary number and table 104 of FIG. 11 illustrates a 20 bit binary number; however, the system will work with alternate number sizes. From the shifted intermediate value y, threshold unit 96 accesses sample transfer function memory unit 68 to determine the output value for processor node 92.

Figure 16:
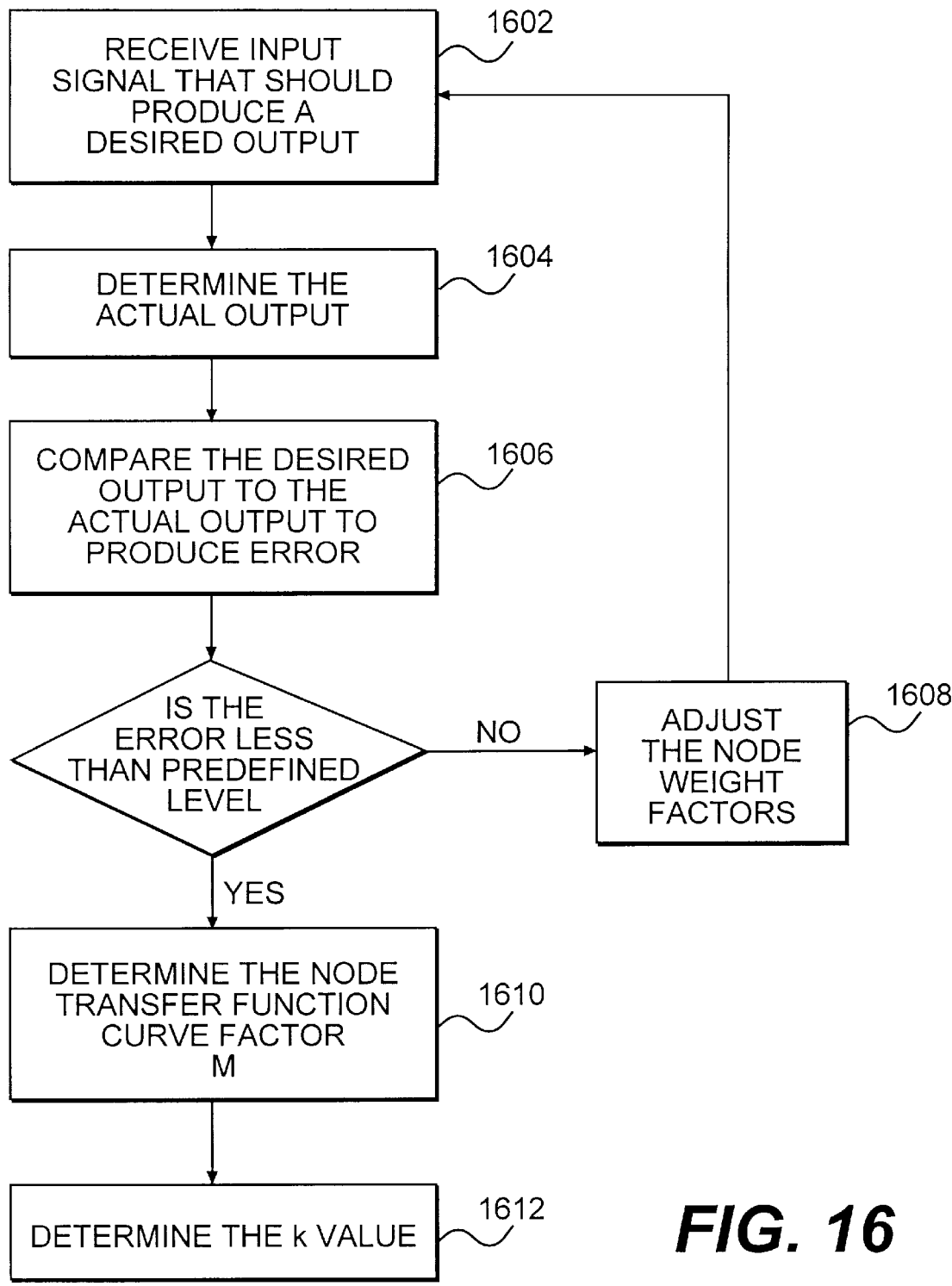
FIG. 16 is a flow chart of the steps of a procedure to determine the value k in accordance with the principles of the present invention.
Figure 17:
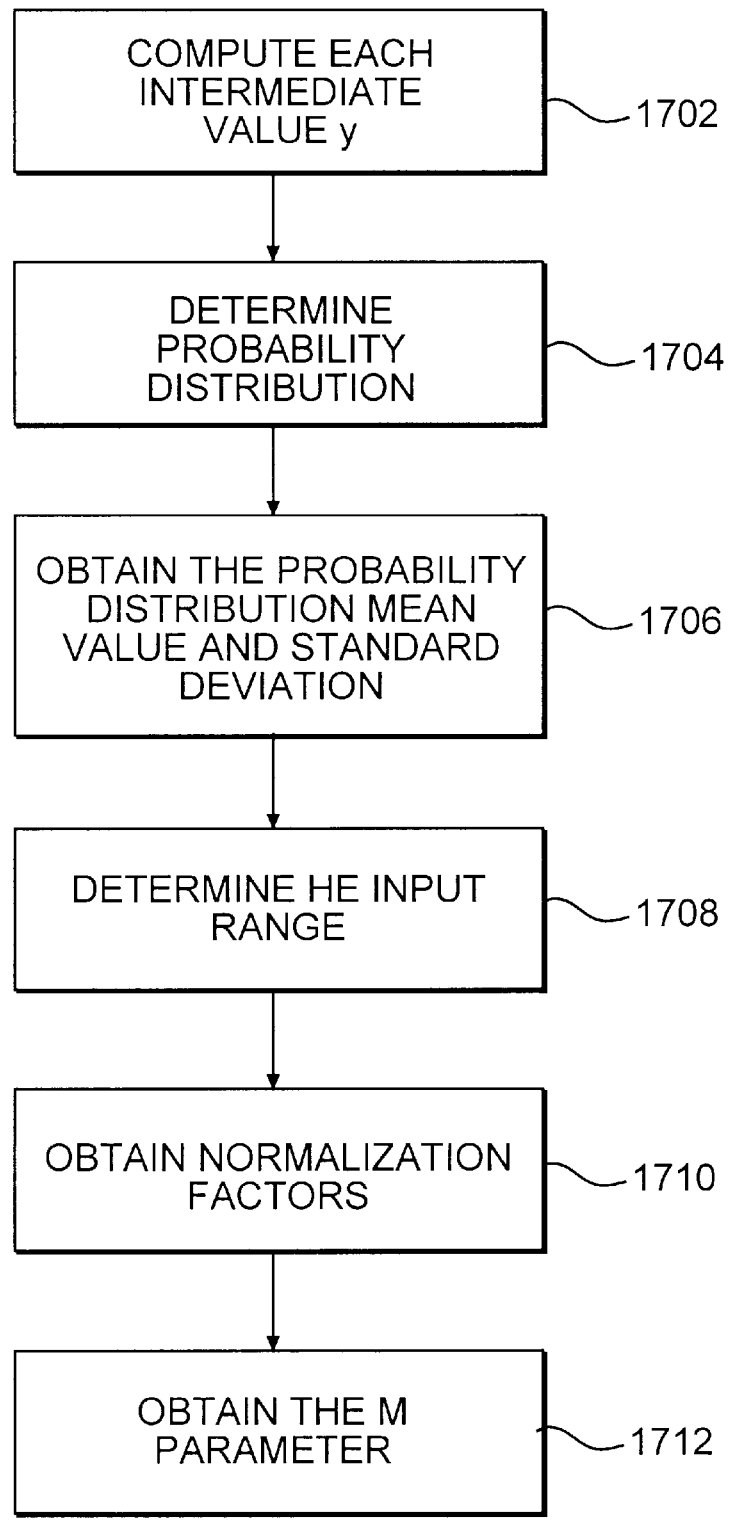
FIG. 17 is a flow chart of the steps of a procedure to determine the M curve factor and the value k in accordance with the principles of the present invention.

The threshold values and shift parameters used in the above described digital ANN are defined by value k. Digital ANN 102 determines the k value for each processor node 92 through the learning process. FIG. 16 is a flow chart of the steps of the learning process. Digital ANN 102 receives input signals that are designed to produce a known output (step 1602). Based on the known input values, digital ANN 102 determines the output value (step 1604). The determined output value is compared to the output value that the known input values should produce and produces an error based on the comparison (step 1606). If the error is greater than a predefined value, the weight factors of the inputs are adjusted and the process repeats (step 1608). If the error is less than a predefined value, digital ANN 102 uses a training pattern to establish a parameter M related to the curve factor of the transfer function (step 1610). Establishing the parameter M includes several substeps. Referring to FIG. 17, after the training process (steps 1602–1608) is completed, digital ANN 102 computes each intermediate value y for every node (step 1702). A distribution curve is plotted from these intermediate y values, preferably the distribution curve approximates a Gaussian distribution (step 1704). From the distribution curve, digital ANN 102 obtains a mean value of the distribution and the standard deviation (σ) of the distribution (step 1706) Using the mean value and standard deviation a the appropriate input range ("IR") of the node specific transfer function is determined (step 1708). The input range of the node specific transfer function is preferably ±1 standard deviation σ from the mean value. This input range corresponds to the normalized range between the threshold values of the node specific transfer function. However, because digital ANN 102 uses a stored sample transfer function, the inputs and weights have to be normalized to fit the input range of the stored sample transfer function. Thus, digital ANN 102 determines normalization factors (step 1710). For example, the range of input values to the node may be between −5 and 25 and the range of the weight values may be between −3.7 and 0.3. Assume the obtained mean value of the intermediate value is 0. In the case of 8-bit resolution, the inputs and weights are normalized to a range between −127 and 128. Thus, the inputs may be normalized by a factor (127/25) and the weights may be normalized by a factor (127/3.7). M is then obtained by multiplying both normalization factors (step 1712). Thus, the k value can be found because, from equation (3), when intermediate value y equals $2^k-1$ then the output of processor node 92 equals both a saturation value (as defined by the curve factor M) and $1/(1+e^y)$. Thus, solving the equations for k, yields the k value for processor node 92 (step 1612).

It will be apparent to those skill in the art that various modifications and variations can be made in the method of the present invention and in construction of the preferred embodiments without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for processing data in a neural network having a stored sample transfer function, comprising:
    a receiver configured to receive at least one input value representing information to be processed by the network;
    a threshold processor configured to determine threshold values indicating boundaries for application of the sample transfer function for a node, the threshold processor comprising:
        a mapper configured to receive a value representing a specific transfer function for the node and map the received value to identify threshold values for the specific transfer function;
        a generator configured to generate an intermediate value from the input value for the node; and
        an output processor configured to determine an output value for the node based on the threshold values and the intermediate value in accordance with the sample transfer function.

2. The apparatus of claim 1 wherein the output processor comprises:
    a comparator configured to compare the intermediate value to the threshold values and to determine the output value for the node in accordance with the sample transfer function if the intermediate value is between the threshold values.

3. The apparatus of claim 2 wherein the threshold values include upper and lower threshold values;
    wherein the comparator comprises:
        a first subcomparator configured to set the output value for the node equal to a first saturation value if the intermediate value is less than the lower threshold value; and
        a second subcomparator configured to set the output value for the node equal to a second saturation value if the intermediate value is greater than the upper threshold value.

4. The apparatus according to claim 1 wherein the output processor comprises:

a shifter configured to shift the intermediate value.

5. A computer program product comprising:

a computer usable medium having computer readable code embodied therein for processing data in a neural network, the computer usable medium comprising:

a receiving module configured to receive an input value representing information to be processed by the network;

a threshold processing module configured to determine threshold values indicating boundaries for application of a sample transfer function for a node, said threshold processing module comprising:

a defining module configured to define a value representing a specific transfer function for the node; and a mapping module configured to map the defined value to identify threshold values for the specific transfer function;

a determining module configured to determine an intermediate value from the input value for the node; and an output processing module configured to determine an output value for the node based on the threshold values and the intermediate value in accordance with the sample transfer function.

6. The product of claim 5 wherein the output processing module comprises:

a comparing module configured to compare the intermediate value to the threshold values and to determine the output value for the node in accordance with the sample transfer function if the intermediate value is between the threshold values.

7. The apparatus according to claim 5 wherein the output processing module comprises:

a shifter configured to shift the intermediate value.

* * * * *